United States Patent
Saito et al.

(10) Patent No.: US 11,402,310 B2
(45) Date of Patent: Aug. 2, 2022

(54) MEASURING APPARATUS FOR MEASURING A FLEXURAL STRENGTH OF A TEST PIECE

(71) Applicant: DISCO CORPORATION, Tokyo (JP)

(72) Inventors: Yoshinobu Saito, Tokyo (JP); Yusaku Ito, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 233 days.

(21) Appl. No.: 15/931,905

(22) Filed: May 14, 2020

(65) Prior Publication Data

US 2020/0371005 A1 Nov. 26, 2020

(30) Foreign Application Priority Data

May 21, 2019 (JP) .............................. JP2019-095163

(51) Int. Cl.
*G01N 3/20* (2006.01)
*G01N 3/06* (2006.01)

(52) U.S. Cl.
CPC .............. *G01N 3/20* (2013.01); *G01N 3/068* (2013.01); *G01N 2203/0023* (2013.01)

(58) Field of Classification Search
None
See application file for complete search history.

(56) References Cited

U.S. PATENT DOCUMENTS

| 6,460,418 B1* | 10/2002 | Hiyoshi | G01N 3/068 73/800 |
| 7,380,451 B2* | 6/2008 | Kawasaki | G03G 15/5029 356/238.1 |
| 7,451,982 B2* | 11/2008 | Kawasaki | G03G 15/5029 271/265.04 |
| 7,458,576 B2* | 12/2008 | Kawasaki | G01L 5/0038 271/265.04 |
| 7,583,413 B2* | 9/2009 | Nojiri | G01S 7/60 73/159 |

FOREIGN PATENT DOCUMENTS

| CN | 103364262 A | 10/2013 |
| CN | 109100240 A | 12/2018 |
| JP | 09229838 A | 9/1997 |

OTHER PUBLICATIONS

Search Report issued in counterpart Singapore patent application No. 10202003858S, dated Apr. 19, 2021.

* cited by examiner

*Primary Examiner* — Peter J Macchiarolo
*Assistant Examiner* — Jermaine L Jenkins
(74) *Attorney, Agent, or Firm* — Greer, Burns & Crain, Ltd.

(57) ABSTRACT

A measuring apparatus for measuring a flexural strength of a test piece includes a support unit having a first support member and a second support member that are spaced from each other, for supporting a lower surface of the test piece, a presser for pressing the test piece, a moving mechanism for relatively moving the presser toward and away from the test piece supported by the support unit, a load measuring unit for measuring a load applied to the presser when the presser presses the test piece supported by the support unit, and a controller having a calculating section for calculating the flexural strength of the test piece on the basis of a thickness and a width of the test piece, a spacing between the first support member and the second support member, and a maximum value of the load measured by the load measuring unit.

15 Claims, 9 Drawing Sheets

MEASURING APPARATUS FOR MEASURING A FLEXURAL STRENGTH OF A TEST PIECE

BACKGROUND OF THE INVENTION

Field of the Invention

The present invention relates to a measuring apparatus for measuring a flexural strength of a test piece.

Description of the Related Art

A plurality of device chips having respective devices such as integrated circuits (ICs) and large scale integration (LSI) circuits are manufactured by dividing semiconductor wafers with those devices formed thereon. The device chips are incorporated in various electronic appliances, typically cellular phones and personal computers.

For dividing a semiconductor wafer, there is used, for example, a cutting apparatus including a chuck table for holding the semiconductor wafer thereon and a cutting unit having an annular cutting blade for cutting the semiconductor wafer held on the chuck table. While the cutting blade is in rotation, it is moved to cut into the semiconductor wafer to divide it into a plurality of device chips. In recent years, as electronic appliances have become smaller and thinner, there have been demands for thinner device chips. To meet such demands, it has been customary to make a semiconductor wafer thinner by grinding the semiconductor wafer before it is divided. A semiconductor wafer is ground by a grinding apparatus including a chuck table for holding the semiconductor wafer thereon and a grinding unit having grinding stones for grinding the semiconductor wafer held on the chuck table.

When a semiconductor wafer is processed by the cutting apparatus and the grinding apparatus referred to above, the semiconductor wafer tends to develop processing strains such as cutting strains and grinding strains. If processing strains remain in device chips divided from the semiconductor wafer, then the device chips may have their mechanical strength lowered and may possibly be broken. Therefore, conditions for processing a semiconductor wafer are established to keep the mechanical strength of device chips at a certain level or higher. The mechanical strength of a device chip is measured by a three-point bending test, for example. In the three-point bending test, a test piece has both ends supported and a central area pressed by a presser, and a load applied to the presser is measured. The flexural strength or bending strength of the test piece is calculated on the basis of the measured load. JP Hei 9-229838A discloses a measuring apparatus for measuring a mechanical strength of a test piece, i.e., a mechanical strength measuring apparatus.

SUMMARY OF THE INVENTION

In a case where a measuring apparatus is used to assess a mechanical strength of a test piece, the measuring apparatus measures a load applied to a presser when the presser presses the test piece. The worker who evaluates the mechanical strength of the test piece calculates the flexural strength of the test piece on the basis of the value of the load output from the measuring apparatus and measuring conditions representing a size of the test piece, dimensions of support members that support the test piece, etc. The mechanical strength of the test piece is assessed on the basis of the flexural strength thus calculated. For assessing the mechanical strength of the test piece on the basis of the flexural strength, it is necessary for the worker to perform some operations including confirming the size of the test piece and the dimensions of the support members, extracting the value of the load measured by the measuring apparatus, calculating the flexural strength, etc. Consequently, it is tedious and time-consuming to acquire the flexural strength of the test piece. Particularly, if the flexural strengths of a number of test pieces are to be acquired, then it is necessary to perform the above operations individually on each of the test pieces, making it more complex to assess the mechanical strengths of the test pieces.

It is therefore an object of the present invention to provide a measuring apparatus capable of easily acquiring a flexural strength of a test piece.

In accordance with an aspect of the present invention, there is provided a measuring apparatus for measuring a flexural strength of a test piece, including a support unit having a first support member and a second support member that are spaced from each other, for supporting a lower surface of the test piece, a presser for pressing the test piece, the presser being disposed in a position above the support unit in alignment with an area between the first support member and the second support member, a moving mechanism for relatively moving the presser toward and away from the test piece supported by the support unit, a load measuring unit for measuring a load applied to the presser when the presser presses the test piece supported by the support unit, and a controller having a calculating section for calculating the flexural strength of the test piece on the basis of a thickness and a width of the test piece, a spacing between the first support member and the second support member, and a maximum value of the load measured by the load measuring unit.

Preferably, the measuring apparatus further includes a support member moving mechanism for moving the first support member and the second support member toward and away from each other to adjust the spacing between the first support member and the second support member.

Preferably, the measuring apparatus further includes an image capturing unit for capturing an image of the test piece, in which the controller further includes a detecting section for detecting the thickness and the width of the test piece on the basis of the image of the test piece captured by the image capturing unit.

In accordance with another aspect of the present invention, there is provided a measuring apparatus for measuring a flexural strength of a test piece, including a support member having a support surface for supporting a lower surface of the test piece and an opening defined therein that is exposed on the support surface, a ball presser disposed in a position above the support member in alignment with the opening in the support member, the ball presser being insertable into the opening, a moving mechanism for relatively moving the ball presser toward and away from the test piece supported by the support member, a load measuring unit for measuring a load applied to the ball presser when the ball presser presses the test piece supported by the support member, and a controller having a calculating section for calculating the flexural strength of the test piece on the basis of a size of the test piece, a size of the opening, a size of the ball presser, and a maximum value of the load measured by the load measuring unit.

In the measuring apparatus according to the aspects of the present invention, the load measuring unit measures the load applied to the presser when the presser presses the test piece, and the controller calculates the flexural strength of the test piece on the basis of the load measured by the load measuring unit. The measuring apparatus thus automatically measures the flexural strength of the test piece, and hence the flexural strength of the test piece can easily be acquired.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
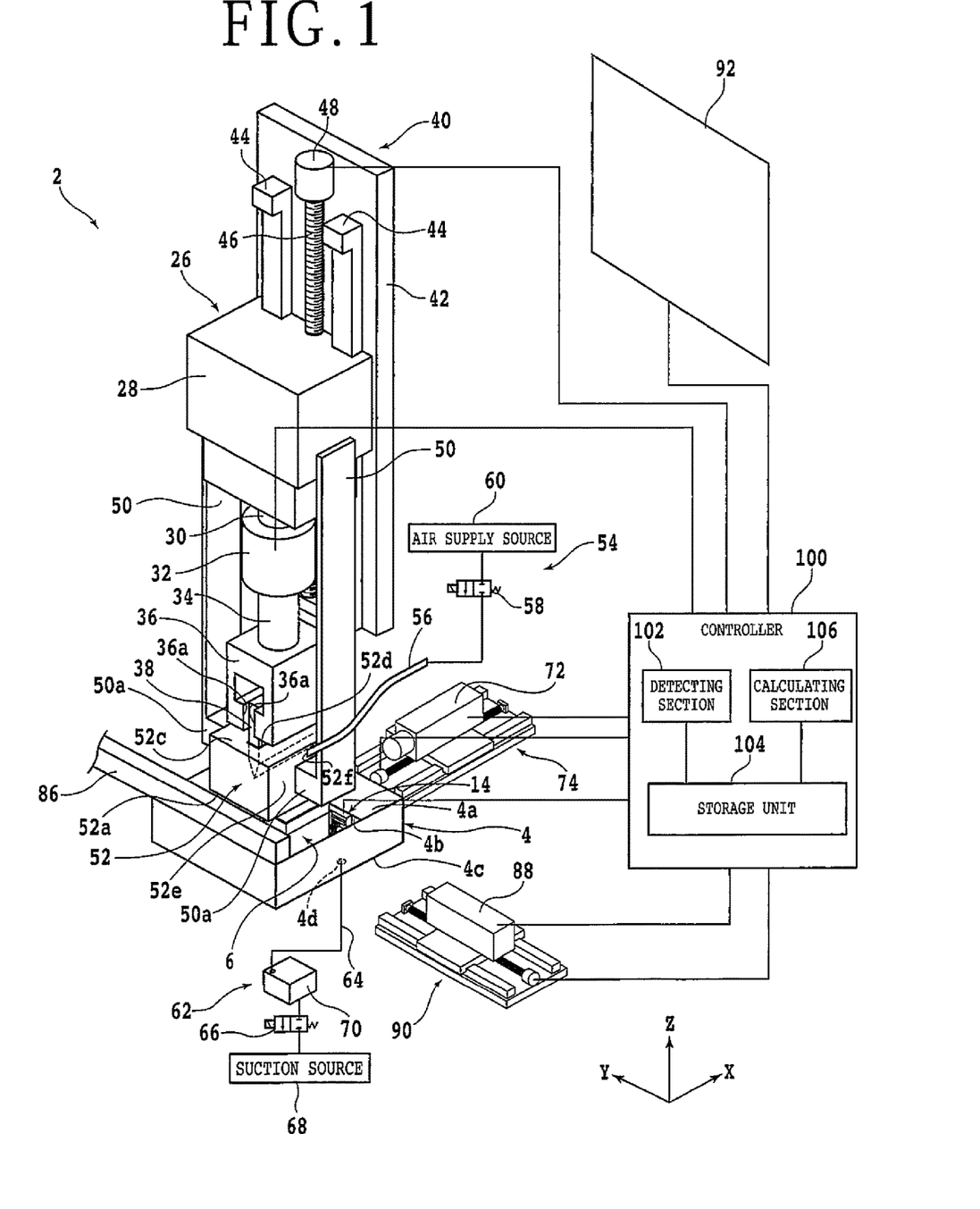
FIG. 1 is a perspective view of a measuring apparatus according to an embodiment of the present invention.

A preferred embodiment of the present invention will be described below with reference to the accompanying drawings. First, a configuration of a measuring apparatus according to the present embodiment will be described below. FIG. 1 illustrates in perspective a measuring apparatus 2 for measuring a flexural strength, i.e., bending strength, of a test piece.

The measuring apparatus 2 measures the flexural strength, i.e., bending strength, of a test piece such as a device chip. The device chip is manufactured from a silicon wafer having devices such as ICs and LSI circuits formed thereon in respective areas demarcated by a grid of projected dicing lines or streets that cross each other, by dividing the silicon wafer along the projected dicing lines. However, the test piece whose flexural strength is to be measured by the measuring apparatus 2 is not limited to any particular type, material, shape, structure, size, etc. For example, the test piece may be a test chip obtained by dividing a wafer whose face side is free of devices and whose reverse side has been ground or polished under predetermined conditions. Results measured by the measuring apparatus 2 as representing the flexural strength of the test chip may be used in selecting conditions for processing semiconductor wafers. Furthermore, the test piece may be a chip obtained by dividing a wafer that is made of a material such as a semiconductor other than silicon (e.g., SiC, GaAs, InP, or GaN), sapphire, glass, ceramics, resin, or metal.

The measuring apparatus 2 includes a box-shaped lower container or housing 4 in the shape of a rectangular parallelepiped. The lower container 4 has an opening 4b in the shape of a rectangular parallelepiped defined therein that is open upwardly through an upper surface 4a of the lower container 4. The opening 4b houses therein a support unit 6 that supports the test piece whose mechanical strength is to be measured by the measuring apparatus 2.

Figure 2:
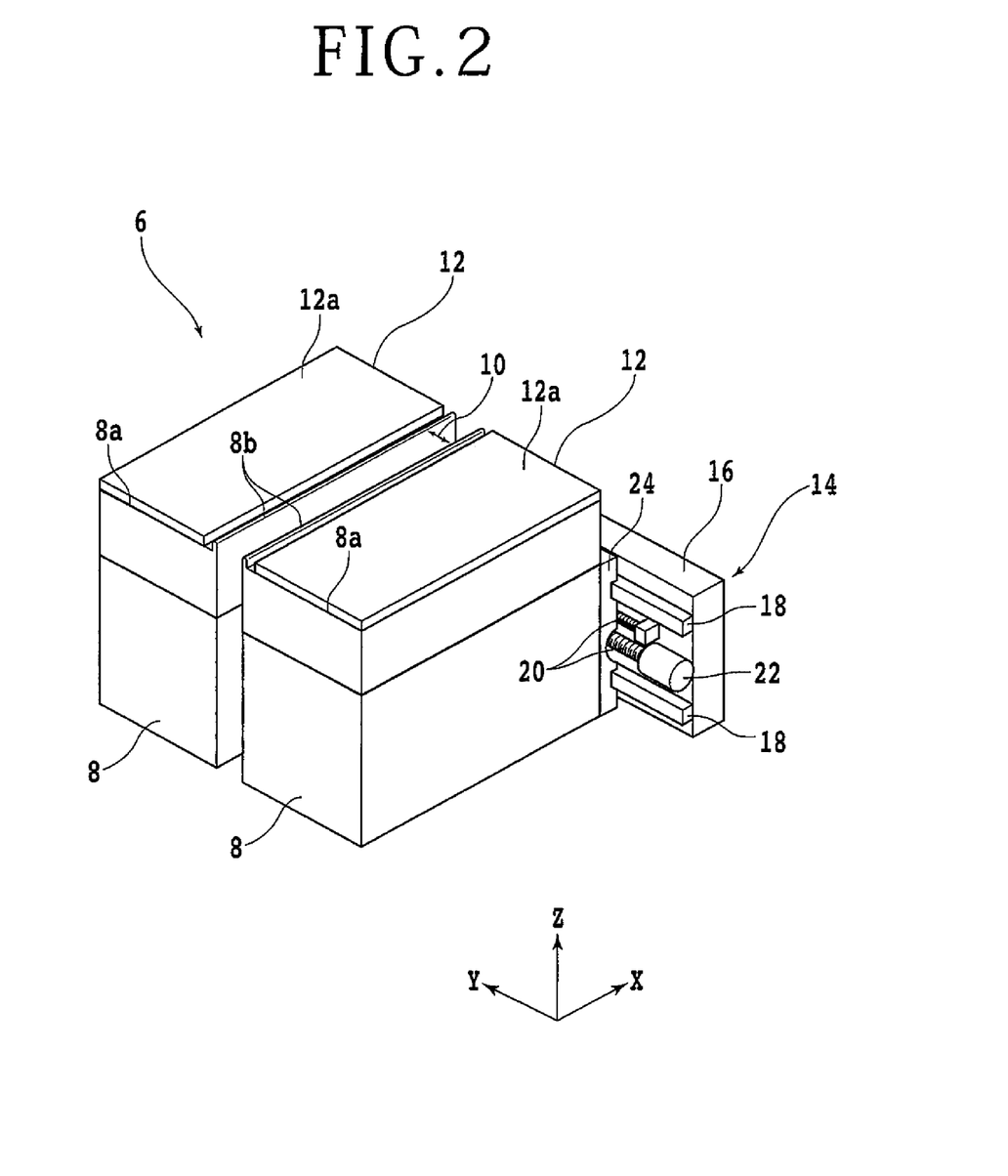
FIG. 2 is a perspective view of a support unit of the measuring apparatus.

FIG. 2 illustrates the support unit 6 in perspective. As illustrated in FIG. 2, the support unit 6 includes a pair of support bases 8 for supporting the test piece thereon. The support bases 8, each shaped as a rectangular parallelepiped, are spaced from each other with a gap 10 defined therebetween. The support bases 8 have respective upper surfaces 8a whose longitudinal directions extend along X-axis directions, i.e., first horizontal directions or forward and rearward directions. The test piece whose flexural strength is to be measured, e.g., a test piece 11 illustrated in FIG. 5, etc., is placed on the support bases 8.

The support bases 8 have respective column-shaped or rod-shaped support members 8b protruding from the respective upper surfaces 8a for supporting a lower surface of the test piece. The support members 8b, i.e., a first support member and a second support member, are made of metal such as stainless steel, for example, and are disposed on edges of the support bases 8 that are close to the gap 10. The support members 8b have longitudinal directions extending along the X-axis directions and are spaced from each other with the gap 10 therebetween. In FIG. 2, the support members 8b have upper surfaces shaped as curved surfaces.

Plate-shaped contact members 12 made of a softer material, such as rubber sponge, than the support members 8b are disposed respectively on the upper surfaces 8a of the support bases 8. The contact members 12 are of a rectangular shape as viewed in plan and are disposed one on each side of the support members 8b. In other words, the contact members 12 are disposed on the sides of the support members 8b remote from the gap 10, and the support members 8b are disposed between the contact members 12. The contact members 12 have upper surfaces as contact surfaces 12a that support the test piece by contacting the lower surface of the test piece. The contact members 12 are dimensioned such that the contact surfaces 12a are positioned upwardly of the upper ends of the support members 8b, e.g., by approximately 1 mm upwardly of the upper ends of the support members 8b. Therefore, when the test piece is placed on the support bases 8, the lower surface of the test piece is not in contact with the support members 8b, but in contact with the contact surfaces 12a of the contact members 12. Details of the manner in which the support members 8b and the contact members 12, and the test piece contact each other will be described later with reference to FIGS. 5, 6, and 7.

A support member moving mechanism 14 for moving the support bases 8 in Y-axis directions, i.e., second horizontal directions or leftward and rightward directions, perpendicular to the X-axis directions is disposed rearwardly of the support bases 8. The support member moving mechanism 14 includes a support structure 16 in the shape of a rectangular parallelepiped. A pair of guide rails 18 extending in the Y-axis directions and spaced from each other is fixed to a front surface, i.e., face side, of the support structure 16. A pair of ball screws 20 extending substantially parallel to the guide rails 18 is disposed between the guide rails 18. Stepping motors 22 are coupled respectively to respective ends of the ball screws 20 for rotating the ball screws 20 about their own axes.

The support member moving mechanism 14 also includes a pair of moving plates 24 fixed respectively to rear surfaces of the support bases 8. The moving plates 24 are slidably mounted on the guide rails 18 fixed to the front surface of the support structure 16. Nuts, not illustrated, are mounted on respective rear surfaces, i.e., reverse sides, of the moving plates 24. The nut on one of the moving plates 24 is threaded over one of the ball screws 20, whereas the nut on the other of the moving plates 24 is threaded over the other of the ball screws 20.

When the stepping motors 22 are energized to rotate the respective ball screws 20 about their own axes, the moving plates 24 with their nuts threaded over the ball screws 20 are moved in the Y-axis directions along the guide rails 18, controlling the positions of the support bases 8 in the Y-axis directions. In this manner, the support member moving mechanism 14 relatively moves the support members 8b toward and away from each other thereby to adjust a spacing between the support members 8b and a width of the gap 10.

The lower container 4 and the opening 4b illustrated in FIG. 1 are not limited to any particular shapes, sizes, etc., but may have shapes, sizes, etc. changed depending on the shapes, sizes, etc., of the support unit 6 and the support member moving mechanism 14.

As illustrated in FIG. 1, a pressing unit 26 is disposed above the lower container 4. The pressing unit 26 presses the test piece supported on the support unit 6 and measures a load imposed on the pressing unit 26 at the time the pressing unit 26 presses the test piece.

Figure 3:
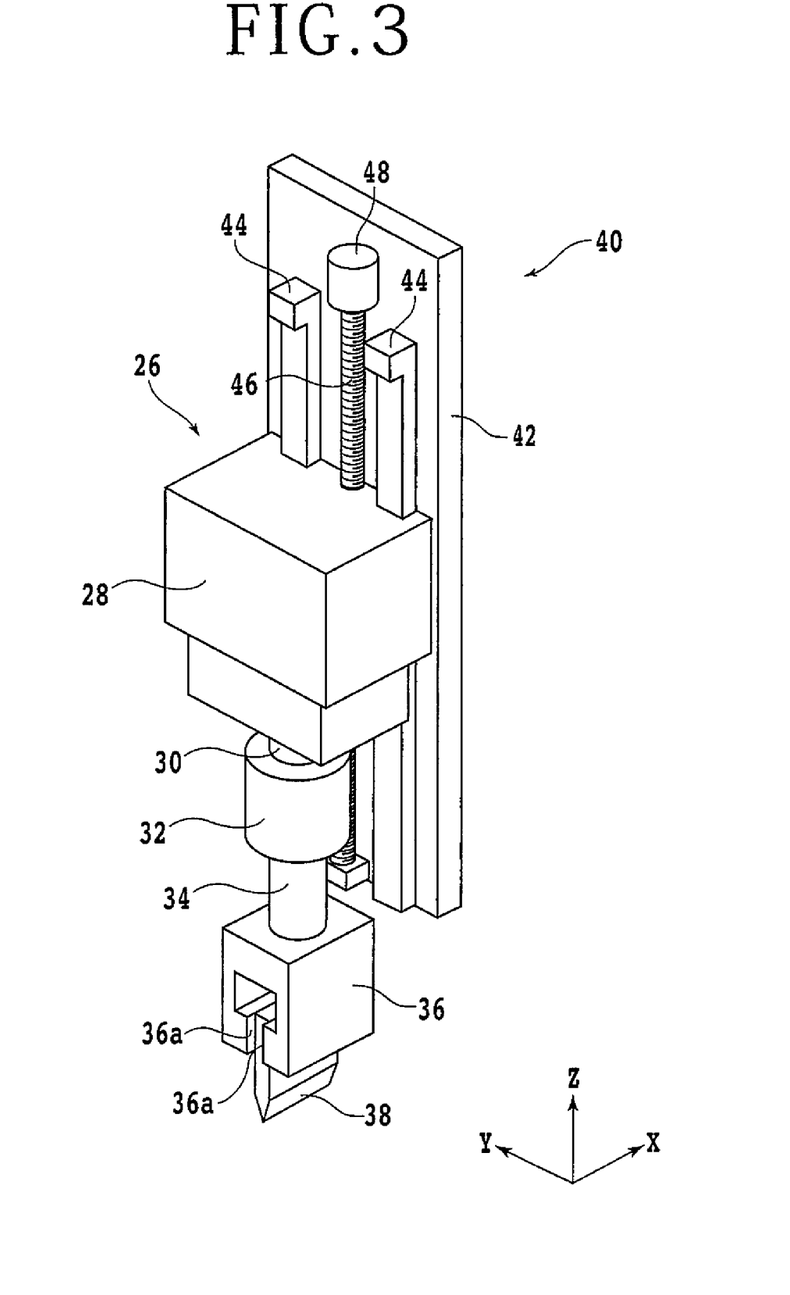
FIG. 3 is a perspective view of a pressing unit of the measuring apparatus.

FIG. 3 illustrates the pressing unit 26 in perspective. As illustrated in FIG. 3, the pressing unit 26 includes a movable base 28 connected to a moving mechanism 40. To the movable base 28, there is connected a cylindrically shaped first support member 30 extending downwardly from a lower surface of the movable base 28. A load measuring unit 32 such as a load cell is fixed to the lower end of the first support member 30. The load measuring unit 32 has a lower end connected to a gripper 36 through a cylindrically shaped second support member 34. The gripper 36 is a substantially portal-shaped as viewed in front elevation, and has a pair of gripping surfaces 36a that faces each other. A presser 38 for pressing the test piece that is supported by the support unit 6 (see FIG. 1) is fixedly gripped between the gripping surfaces 36a.

The presser 38 has a distal end portion, i.e., a lower end portion, tapered off downwardly with its width progressively smaller downwardly. In other words, the distal end portion of the presser 38 has opposite side surfaces slanted with respect to vertical directions, i.e., Z-axis directions. The presser 38 has a tip end, i.e., a lower end, shaped as a round end (see FIG. 5). However, the presser 38 is not limited to the shape described above. The presser 38 is gripped by the gripper 36 such that the lower end of the presser 38 extends along the X-axis directions. In other words, the lower end of the presser 38 and the support members 8b (see FIG. 2) of the support unit 6 lie generally parallel to each other.

The pressing unit 26 is vertically movable along the Z-axis directions, i.e., vertical directions or upward and downward directions, by a moving mechanism 40 disposed rearwardly of the pressing unit 26, i.e., behind the pressing unit 26. The moving mechanism 40 includes a support structure 42 in the shape of a rectangular parallelepiped. A pair of guide rails 44 extending in the Z-axis directions and spaced from each other is fixed to a front surface, i.e., face side, of the support structure 42. A ball screw 46 extending substantially parallel to the guide rails 44 are disposed between the guide rails 44. A stepping motor 48 is coupled to an end of the ball screw 46 for rotating the ball screw 46 about its own axis. The movable base 28 of the pressing unit 26 has a rear surface, or a reverse side, slidably mounted on the guide rails 44. A nut, not illustrated, is mounted on the rear surface of the movable base 28 and threaded over the ball screw 46.

When the stepping motor 48 is energized to rotate the ball screw 46 about its own axis, the movable base 28 is moved in the Z-axis directions along the guide rails 44. The position of the pressing unit 26 in the Z-axis directions is thus controlled. When the moving mechanism 40 moves the pressing unit 26 along the Z-axis directions, the presser 38 is relatively moved toward and away from the test piece supported by the support unit 6 (see FIG. 1).

As illustrated in FIG. 1, a pair of plate-shaped connecting members 50 is fixed respectively to both side surfaces of the movable base 28. The connecting members 50 extend downwardly from the side surfaces of the movable base 28 and have lower ends disposed downwardly of the lower end of the gripper 36. A pair of upper container support members 50a that protrudes toward the presser 38 is disposed on respective lower end portions of the connecting members 50. An upper container or cover 52 shaped as a rectangular parallelepiped that covers the distal end portion of the presser 38 is disposed between and fixed to the upper container support members 50a.

The upper container 52 is disposed above the lower container 4 and has both side surface supported by the upper container support members 50a. The upper container 52 is made of a transparent material such as glass or plastics and is of a box shape. The upper container 52 has an opening 52b (see FIG. 5) in the shape of a rectangular parallelepiped defined therein that is open downwardly through a lower surface 52a of the upper container 52. The upper container 52 has an upper surface 52c with a presser insertion hole 52d defined therein, and the distal end portion of the presser 38 is inserted in the presser insertion hole 52d. Therefore, the distal end portion of the presser 38 is covered in the upper container 52. In FIG. 1, the distal end portion of the presser 38 that is covered in the upper container 52 is indicated by the broken lines.

The upper container 52 is of a size that can be inserted in the opening 4b in the lower container 4. The upper container 52 is disposed within the opening 4b in the lower container 4 as viewed in plan. The opening 52b (see FIG. 5) of the upper container 52 is of a size large enough to accommodate the support unit 6 therein. Therefore, when the moving mechanism 40 moves the pressing unit 26 downwardly, the upper container 52 is inserted into the opening 4b in the lower container 4, and the support unit 6 has an upper portion covered in the upper container 52.

The upper container 52 has a side wall 52e with a nozzle insertion hole 52f defined therein. An air supply unit 54 for applying air to the distal end portion of the presser 38 is connected to the nozzle insertion hole 52f. The air supply unit 54 includes a nozzle 56 for ejecting air toward the presser 38. The nozzle 56 has an end portion inserted through the nozzle insertion hole 52f into the upper container 52, and another end portion connected through a valve 58 to an air supply source 60. The end portion of the nozzle 56 that is inserted into the upper container 52 has a distal end 56a (see FIG. 5) that is open toward a side surface of the distal end portion of the presser 38. When the air supply source 60 applies air through the valve 58 and the nozzle 56 to the side surface of the distal end portion of the presser 38, the applied air removes foreign matter that has been deposited on the distal end portion of the presser 38. Details of operation of the air supply unit 54 will be described later.

As illustrated in FIG. 1, the lower container 4 has a bottom wall with a fragment discharge port 4d defined therein that extends from the bottom of the opening 4b in the lower container 4 to a lower surface, i.e., a bottom surface, 4c of the lower container 4. The fragment discharge port 4d is connected to a fragment discharge unit 62 that discharges fragments of the test piece that are present in the lower container 4. The fragment discharge unit 62 includes a fragment discharge passageway 64 that provides a channel for discharging test piece fragments. The fragment discharge passageway 64 has an end connected to the fragment discharge port 4d and another end connected through a valve 66 to a suction source 68. A fragment retriever 70 for retrieving test piece fragments is connected to the fragment discharge passageway 64. The fragment retriever 70 includes a filter, etc. for trapping test piece fragments that flow through the fragment discharge passageway 64. When the valve 66 is opened, test piece fragments scattered in the opening 4b in the lower container 4 are drawn from the fragment discharge port 4d into the fragment discharge passageway 64 and retrieved by the fragment retriever 70. Details of operation of the fragment discharge unit 62 will be described later.

An image capturing unit 72 including a camera, etc. is disposed behind the lower container 4. The image capturing unit 72 captures an image of the test piece, the presser 38, etc. supported by the support unit 6 from behind the lower container 4. The image capturing unit 72 is connected to a moving mechanism 74 that moves the image capturing unit 72 along the X-axis directions.

Figure 4:
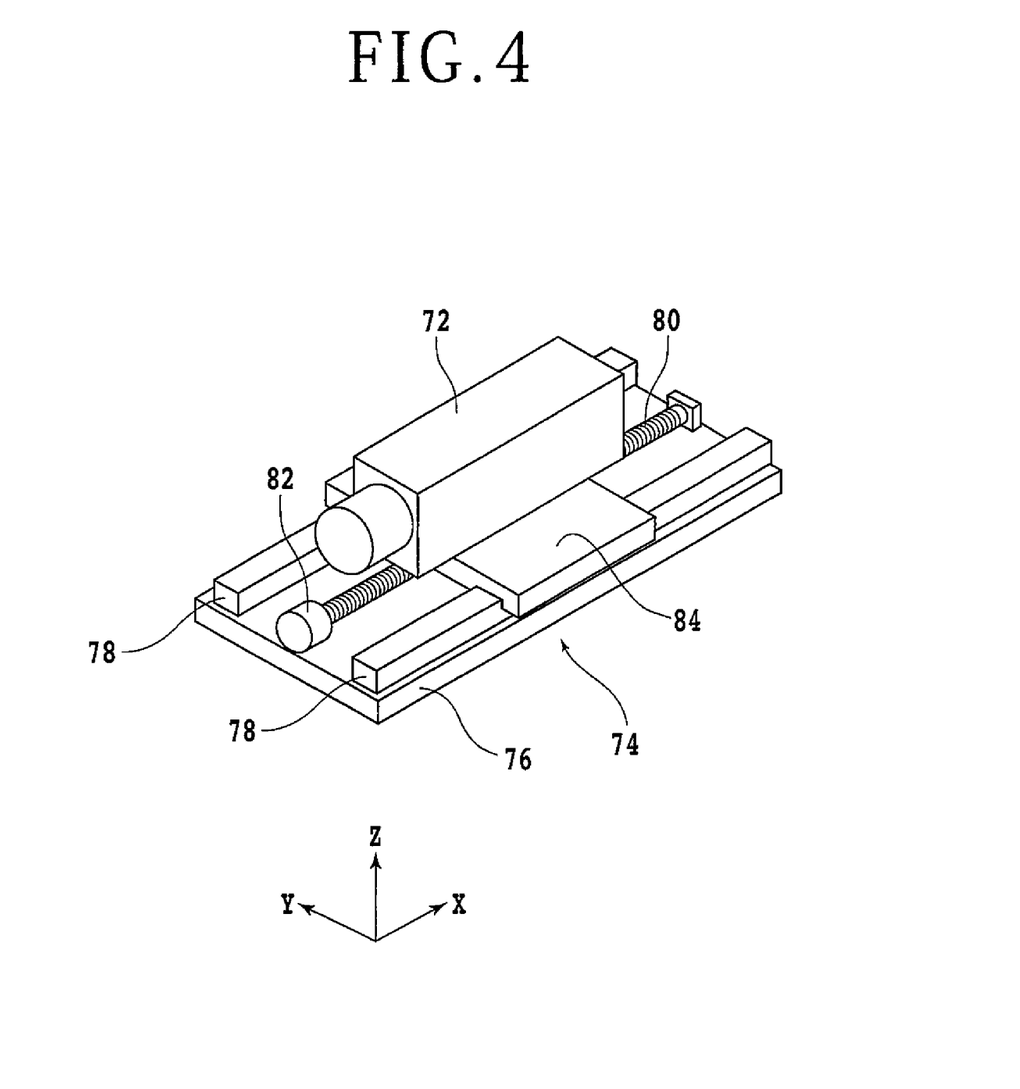
FIG. 4 is a perspective view of an image capturing unit and a moving mechanism of the measuring apparatus.

FIG. 4 illustrates the image capturing unit 72 and the moving mechanism 74 in perspective. The moving mechanism 74 includes a support plate 76 that is of a rectangular shape as viewed in plan and a pair of guide rails 78 fixedly mounted on an upper surface, i.e., a face side, of the support plate 76. The guide rails 78 extend along the X-axis directions and are spaced from each other by a predetermined distance. A ball screw 80 extending generally parallel to the guide rails 78 is disposed between the guide rails 78. A stepping motor 82 for rotating the ball screw 80 about its own axis is connected to an end of the ball screw 80. A movable plate 84 that is of a rectangular shape as viewed in plan is slidably mounted on the guide rails 78. A nut, not illustrated, is mounted on a lower surface, i.e., a reverse side, of the movable plate 84 and threaded over the ball screw 80. The image capturing unit 72 is fixedly mounted on an upper surface, i.e., a face side, of the movable plate 84.

When the stepping motor 82 is energized to rotate the ball screw 80 about its own axis, the movable plate 84 is moved in the X-axis directions along the guide rails 78, controlling the position of the image capturing unit 72 in the X-axis directions. When the moving mechanism 74 moves the image capturing unit 72 along the X-axis directions, the image capturing unit 72 is relatively moved toward and away from the test piece and the presser 38 that are supported by the support unit 6 (see FIG. 1).

As illustrated in FIG. 1, a light source 86 for emitting light toward the image capturing unit 72 is disposed in front of the lower container 4. While the light source 86 is emitting light, the image capturing unit 72 captures an image of the test piece and the distal end portion of the presser 38 for thereby confirming, for example, the size of the test piece, the way in which the test piece is pressed by the presser 38, and the state of the distal end portion of the presser 38, i.e., whether or not foreign matter is deposited thereon, whether or not it has chipped, etc. In a case where the image capturing unit 72 captures images in a sufficient bright environment, the light source 86 may be omitted.

Furthermore, an image capturing unit 88 including a camera, etc. is disposed on one side of the lower container 4. The image capturing unit 88 captures an image of the test piece, the presser 38, etc. supported by the support unit 6 from the side of the lower container 4. The image capturing unit 88 is connected to a moving mechanism 90 that moves the image capturing unit 88 along the Y-axis directions. The image capturing unit 88 and the moving mechanism 90 are structurally similar to the image capturing unit 72 and the moving mechanism 74, respectively.

The measuring apparatus 2 also includes a display unit 92 for displaying various pieces of information regarding the measurement of the mechanical strength of the test piece. The display unit 92 includes a touch-panel monitor functioning as a user interface, for example. The operator of the measuring apparatus 2 can enter information representing measuring conditions, etc. into the measuring apparatus 2 using the touch-panel monitor.

Furthermore, the measuring apparatus 2 includes a controller 100 connected to the components of the measuring apparatus 2, i.e., the support member moving mechanism 14, the load measuring unit 32, the moving mechanism 40, the air supply unit 54, the fragment discharge unit 62, the image capturing unit 72, the moving mechanism 74, the light source 86, the image capturing unit 88, the moving mechanism 90, the display unit 92, etc. The controller 100, which includes a computer or the like, for example, controls operation of the components of the measuring apparatus 2. The load applied to the presser 38, i.e., the force applied thereto in the Z-axis directions, when the presser 38 presses the test piece supported by the support unit 6 is measured by the load measuring unit 32 and input to the controller 100. The controller 100 then calculates the flexural strength of the test piece on the basis of the input load. Details of operation of the controller 100 for calculating the flexural strength will be described later.

The measuring apparatus 2 described above performs a three-point bending test on the test piece and automatically calculates the flexural strength of the test piece. A specific example of operation of the measuring apparatus 2 will be described below.

For measuring the flexural strength of the test piece on the measuring apparatus 2, the support member moving mechanism 14 (see FIG. 2) adjusts the positions of the support bases 8 in the Y-axis directions. The positions of the support bases 8 are adjusted in order to set the spacing between the support bases 8 to a predetermined value.

Figure 5:
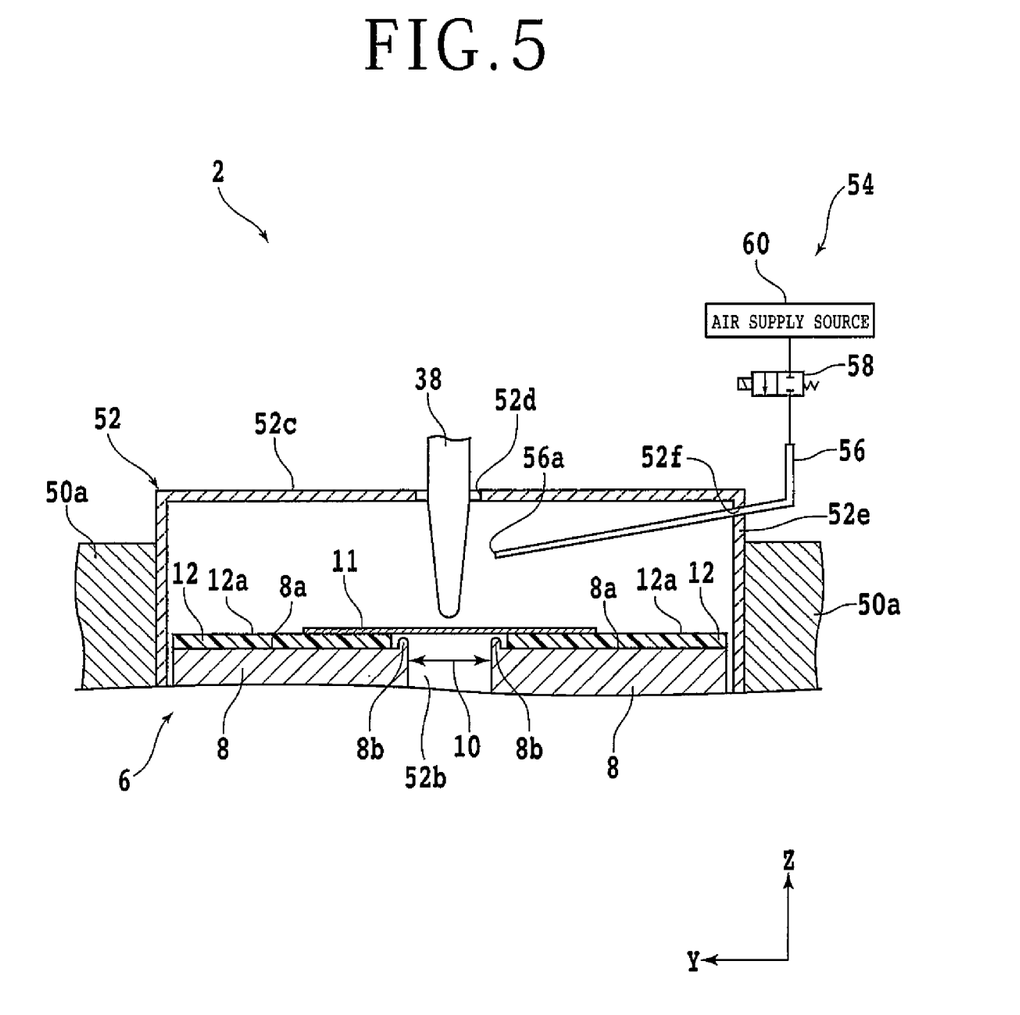
FIG. 5 is a fragmentary cross-sectional view of the measuring apparatus, illustrating the manner in which a test piece is supported by the support unit.

Next, a test piece 11 (see FIG. 5) is conveyed onto the support bases 8. FIG. 5 illustrates in cross section the measuring apparatus 2 in which the test piece 11 is supported by the support unit 6. As illustrated in FIG. 5, the test piece 11 has opposite end portions supported respectively on the support bases 8 and a central position placed over a gap 10 between the support bases 8. The presser 38 is disposed in a position above the support members 8b in alignment with the area between the support members 8b, i.e., the gap 10.

When the test piece 11 is placed onto the support bases 8, if the lower surface of the test piece 11 is brought into contact with the support members 8b, the lower surface of the test piece 11 may possibly be damaged on account of the impact on the test piece 11 as it is placed on the support bases 8. In a case where the lower surface of the test piece 11 is damaged, the flexural strength of the test piece 11 is altered, making it difficult to measure the flexural strengths of a plurality of test pieces 11 under the same conditions. However, the measuring apparatus 2 includes the contact members 12, which are made of a softer material than the support members 8b, disposed on the upper surfaces 8a of the support bases 8, and the contact surfaces 12a of the contact members 12 are positioned upwardly of the upper ends of the support members 8b. Therefore, when the test piece 11 is placed onto the support bases 8, the test piece 11 contacts the contact surfaces 12a of the contact members 12 and stays out of contact with the support members 8b, and is supported by the contact surfaces 12a. The test piece 11 is thus prevented from contacting the support members 8b and from being damaged thereby, and is restrained from altering its mechanical strength.

Then, the size of the test piece 11 supported by the support unit 6 is detected. The size of the test piece 11 is detected by the controller 100 illustrated in FIG. 1. As illustrated in FIG. 1, the controller 100 includes a detecting section 102 for detecting the size of the test piece 11 and a storage unit 104 for storing various data used in the processing sequences of the controller 100.

For example, the detecting section 102 detects the size of the test piece 11 on the basis of an image of the test piece 11 acquired by the image capturing unit 88. Specifically, the image capturing unit 88 acquires an image the test piece 11 from one side thereof. The acquired image includes an image of a side surface of the test piece 11, i.e., a surface parallel to the X-axis directions and the Z-axis directions. The image captured by the image capturing unit 88 is output to the controller 100 and stored in the storage unit 104. The detecting section 102 detects the size of the test piece 11, i.e., a thickness, a width, etc. thereof, by performing an image processing process such as edge detection on the image of the test piece 11, for example. The width of the test piece 11 corresponds to a length of the test piece 11 in lengthwise directions, i.e., the X-axis directions, of the support members 8b (see FIG. 2). Specifically, the detecting section 102 identifies coordinates of upper, lower, front, and rear ends of the test piece 11 on the basis of shades of the image of the test piece 11. Then, the detecting section 102 calculates the thickness of the test piece 11 from differences between the coordinates of the upper end and the coordinates of the lower end of the test piece 11, and calculates the width of the test piece 11 from differences between the coordinates of the front end and the coordinates of the rear end of the test piece 11. The thickness and the width of the test piece 11 detected by the detecting section 102 are stored in the storage unit 104.

The detection of the size of the test piece 11 is not limited to any particular detecting method. For example, when the test piece 11 is conveyed onto the support unit 6, an image of the test piece 11 may be captured by another image capturing unit disposed somewhere on the path along which the test piece 11 is conveyed onto the support unit 6. In such a case, the detecting section 102 detects the size of the test piece 11 on the basis of the image captured by the image capturing unit. Alternatively, the size of the test piece 11 may have been measured by another method and stored in the storage unit 104. In this case, the detection by the detecting section 102 of the size of the test piece 11 may be omitted.

Next, the moving mechanism 40 lowers the pressing unit 26. As the moving mechanism 40 lowers the pressing unit 26, the tip end of the presser 38 contacts the upper surface of the test piece 11 (see FIG. 6), and the presser 38 presses the test piece 11 downwardly. A load that is applied to the presser 38 as it presses the test piece 11 is measured by the load measuring unit 32 (see FIG. 1). The value of the load measured by the load measuring unit 32 is output to the controller 100 and stored in the storage unit 104.

Figure 6:
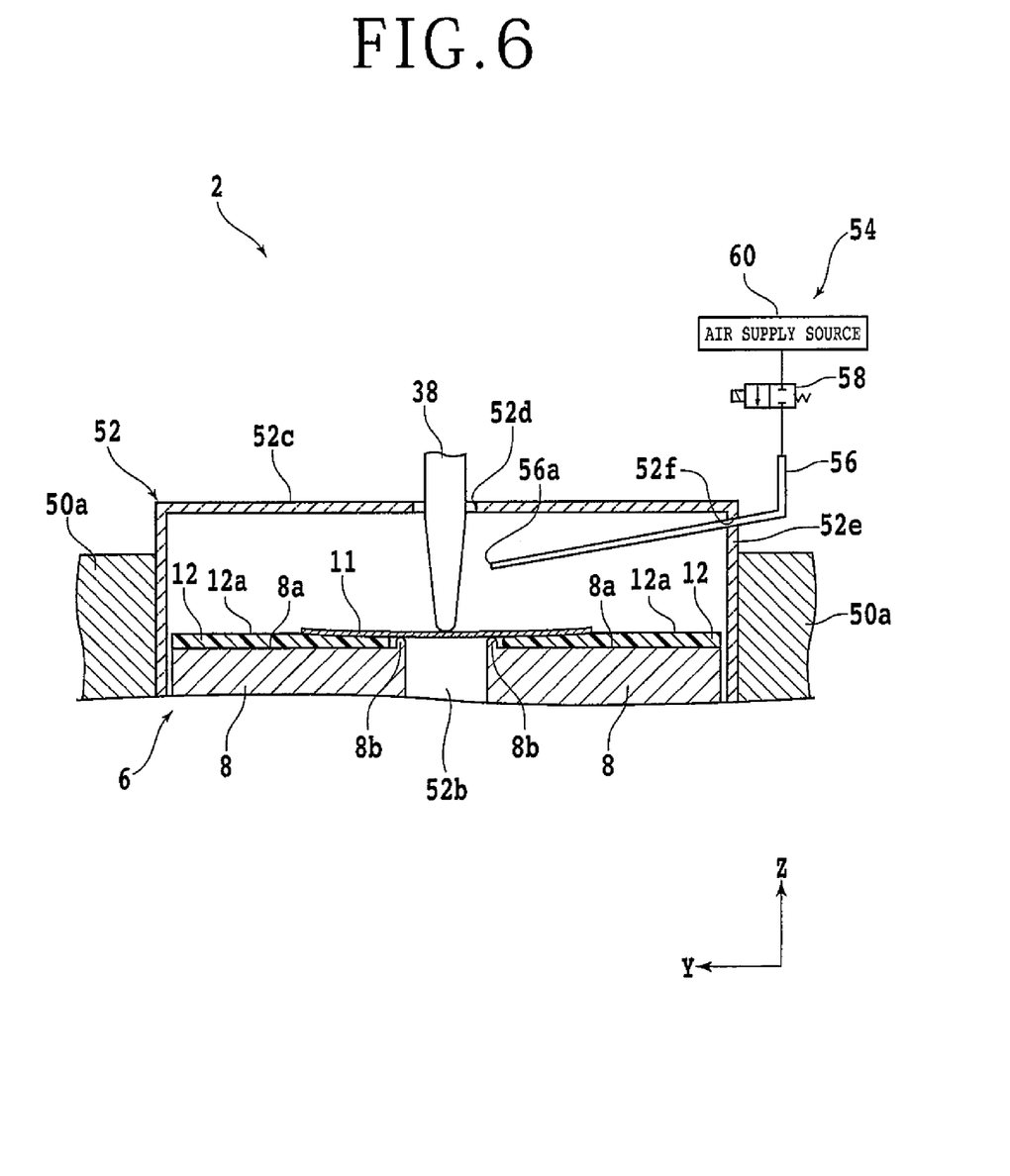
FIG. 6 is a fragmentary cross-sectional view of the measuring apparatus, illustrating the manner in which the test piece is in contact with a pair of support members.

When the moving mechanism 40 further lowers the pressing unit 26, the test piece 11 is further pressed by the presser 38 and the contact members 12 that support the test piece 11 are deformed, allowing the test piece 11 to bend. As a result, the lower surface of the test piece 11 is brought into contact with the support members 8b of the support bases 8. At this time, depending on the pliability of the contact members 12 and the rigidity of the test piece 11, only the contact members 12 may be deformed and the test piece 11 may not bend. FIG. 6 illustrates in cross section the measuring apparatus 2 in which the test piece 11 is in contact with the support members 8b. When the test piece 11 is brought into contact with the support members 8b, the test piece 11 is supported by the support members 8b, increasing the load applied to the presser 38 that presses the test piece 11.

Figure 7:
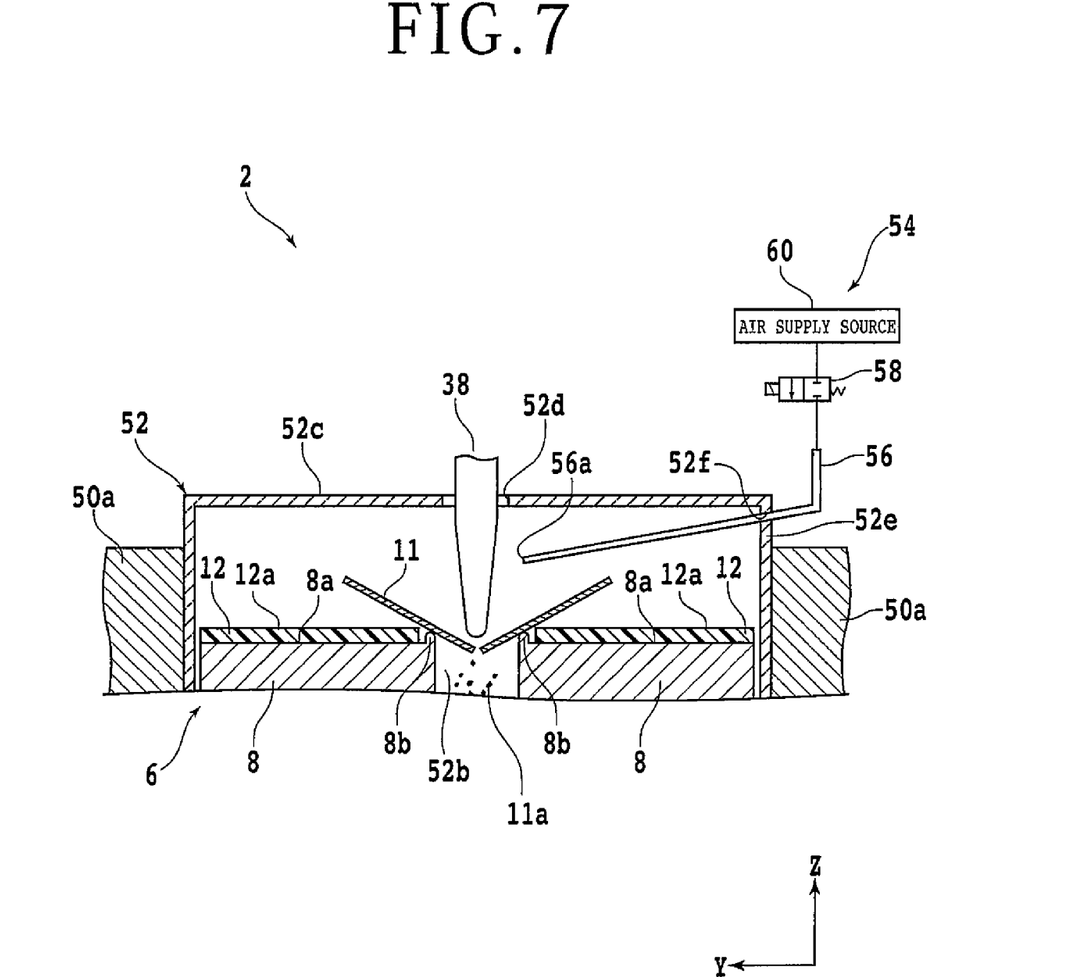
FIG. 7 is a fragmentary cross-sectional view of the measuring apparatus, illustrating the manner in which the test piece is broken.

When the moving mechanism 40 further lowers the pressing unit 26, the test piece 11 is further pressed by the presser 38 while being supported by the support members 8b, and bends further. When the pressing force applied from the presser 38 to the test piece 11 exceeds a predetermined value, the test piece 11 is broken. FIG. 7 illustrates in cross section the measuring apparatus 2 in which the test piece 11 is broken. At the time the test piece 11 is broken, the load measured by the load measuring unit 32 (see FIG. 1) decreases from its maximum value to zero. Therefore, the time at which the test piece 11 is broken can be detected from the change in the value of the load measured by the load measuring unit 32. The maximum value of the load measured by the load measuring unit 32, i.e., the value of the load measured when the test piece 11 is broken, corresponds to the mechanical strength of the test piece 11.

As illustrated in FIG. 1, the controller 100 includes a calculating section 106 for calculating the flexural strength of the test piece 11. The calculating section 106 calculates the flexural strength of the test piece 11 on the basis of the size of the test piece 11, the spacing between the support members 8b, and the load measured by the load measuring unit 32. The spacing between the support members 8b corresponds to the distance between the upper ends of the support members 8b that support the test piece 11.

A flexural strength, indicated by $\sigma$, of the test piece 11 is expressed as $\sigma = 3WL/2bh^2$ where W represents the maximum value [N] of the load applied to the presser 38 that presses the test piece 11, L the spacing [mm] between the support members 8b, h the thickness [mm] of the test piece 11, and b the width [mm] of the test piece 11. The detecting section 102 calculates the flexural strength $\sigma$ of the test piece 11 according to the above equation. The thickness h and the width b of the test piece 11 are detected by the detecting section 102, for example, and stored in the storage unit 104. The maximum value W of the load corresponds to the load measured by the load measuring unit 32 at the time the test piece 11 is broken by being pressed by the presser 38 and is stored in the storage unit 104. The spacing L between the support members 8b is measured in advance and stored in the storage unit 104. The detecting section 102 calculates the flexural strength $\sigma$ of the test piece 11 using these values stored in the storage unit 104.

The acquisition of the spacing L between the support members 8b is not limited to any particular acquiring method. For example, the support member moving mechanism 14 (see FIG. 2) may have a scale graduated with coordinate values indicative of the positions of the support members 8b and a reading head for reading the coordinate values of the scale. The reading head reads coordinate values of the scale to acquire the coordinates of the support members 8b in the Y-axis directions. The spacing L between the support members 8b is calculated from the differences between the coordinates of the support members 8b. The flexural strength of the test piece 11 may be measured while the support members 8b are being fixed at preset positions. In this case, the spacing L between the support members 8b is stored as a fixed value in the storage unit 104 in advance.

The flexural strength of the test piece 11 calculated by the calculating section 106 is displayed on the display unit 92, for example. Thus, the operator of the measuring apparatus 2 can confirm the flexural strength of the test piece 11. The calculated flexural strength may be output to outside of the measuring apparatus 2.

As described above, the measuring apparatus 2 according to the present embodiment includes the controller 100 that calculates the flexural strength of the test piece 11 on the basis of the size of the test piece 11, the spacing between the support members 8b, and the load measured by the load measuring unit 32. The measuring apparatus 2 can thus automatically calculate the flexural strength of the test piece 11. Therefore, it is not necessary for the worker to manually calculate the flexural strength, and hence the flexural strength of the test piece 11 can easily be acquired.

In the measurement of the flexural strength of the test piece 11, when the test piece 11 is broken as illustrated in FIG. 7, fragments 11a from the test piece 11 are scattered. In the measuring apparatus 2, however, when the test piece 11 is pressed by the presser 38, the upper container 52 is positioned in covering relation to the test piece 11 and the upper portion of the support unit 6. As a result, the fragments 11a from the test piece 11 are prevented by the upper container 52 from being scattered out of the measuring apparatus 2. Since the upper container 52 prevents the fragments 11a from being scattered, the operator of the measuring apparatus 2 may not wear protectors such as goggles when the flexural strength of the test piece 11 is to be measured. Consequently, the visibility of components such as the presser 38 of the measuring apparatus 2 and the test piece 11 is prevented from suffering reductions which would otherwise be caused by the wearing of protective tools.

When the presser 38 presses the test piece 11, foreign matter such fragments 11a from the test piece 11, etc. may possibly be deposited on the presser 38. It is preferable to remove such foreign matter as it may adversely affect the accuracy of the bending test. Accordingly, after the test piece 11 has been tested, it is preferable that the air supply unit 54 apply air to the presser 38 to remove foreign matter deposited on the presser 38. Specifically, the valve 58 of the air supply unit 54 is opened to eject air supplied from the air supply source 60 from the distal end 56a of the nozzle 56 toward the side surface of the distal end portion of the presser 38. Foreign matter deposited on the presser 38 is now blown away and removed. The removal of foreign matter from the presser 38 using the air supply unit 54 is not limited to any particular timing. For example, the removal of foreign matter from the presser 38 may be carried out at any time as required after the test on one test piece 11 has been completed and before the test on a next test piece 11 is carried out.

The air ejected toward the distal end portion of the presser 38 flows in the upper container 52 and is also applied to the support bases 8. As a result, foreign matter such as fragments 11a from the test piece 11 deposited on the support members 8b and the contact surfaces 12a of the contact members 12 is blown away and removed by the applied air. Consequently, when the test is performed on a next test piece 11, the test piece 11 is prevented from being damaged by foreign matter that would otherwise remain on the support members 8b and the contact surfaces 12a and contact the lower surface of the test piece 11.

If the distal end 56a of the nozzle 56 were directed toward the upper surfaces 8a of the support bases 8, the air ejected from the nozzle 56 would be forcefully applied to the upper surfaces 8a of the support bases 8. In this case, foreign matter deposited on the support members 8b and the contact members 12 would be blown away by the air, fly up in the upper container 52, and then be deposited again on the support members 8b and the contact members 12. Therefore, foreign matter would not be adequately removed from the upper surfaces 8a of the support bases 8. According to the present embodiment, however, the distal end 56a of the nozzle 56 is oriented toward the side surface of the distal end portion of the presser 38. The distal end 56a of the nozzle 56 thus oriented appropriately reduces the force of air applied to the upper surfaces 8a of the support bases 8, assisting in properly removing foreign matter from the upper surfaces 8a of the support bases 8.

When test pieces 11 are repeatedly tested and foreign matter is repeatedly removed by the air supply unit 54, fragments 11a of the test pieces 11 are accumulated in the lower container 4 (see FIG. 1). The fragments 11a accumulated in the lower container 4 should preferably be retrieved by the fragment discharge unit 62 (see FIG. 1). Specifically, the valve 66 of the fragment discharge unit 62 is opened while the suction source 68 is in operation, drawing out the fragments 11a accumulated in the lower container 4 under suction from the fragment discharge port 4d defined in the bottom wall of the lower container 4. The fragments 11a thus drawn out pass through the fragment discharge passageway 64 and are retrieved by the fragment retriever 70. By using the fragment discharge unit 62, therefore, the accumulated fragments 11a can quickly be removed from the lower container 4 without manually cleaning the opening 4b in the lower container 4.

In the measuring apparatus 2, the upper container 52 is smaller than the opening 4b in the lower container 4, and has the presser insertion hole 52d defined therein for inserting the presser 38 therein. Therefore, when the upper container 52 is lowered into the lower container 4, the opening 4b in the lower container 4 is not hermetically sealed by the upper container 52. When the fragments 11a in the test piece 11 are drawn out from the fragment discharge port 4d, ambient air is easily introduced into the opening 4b, allowing the fragments 11a to be drawn out smoothly from the fragment discharge port 4d.

In the above embodiment, the flexural strength of the test piece 11 is measured according to a three-point bending test. However, the measuring apparatus according to the present invention may measure the flexural strength of the test piece 11 according to a ball flexural strength test or a four-point bending test.

Figure 8:
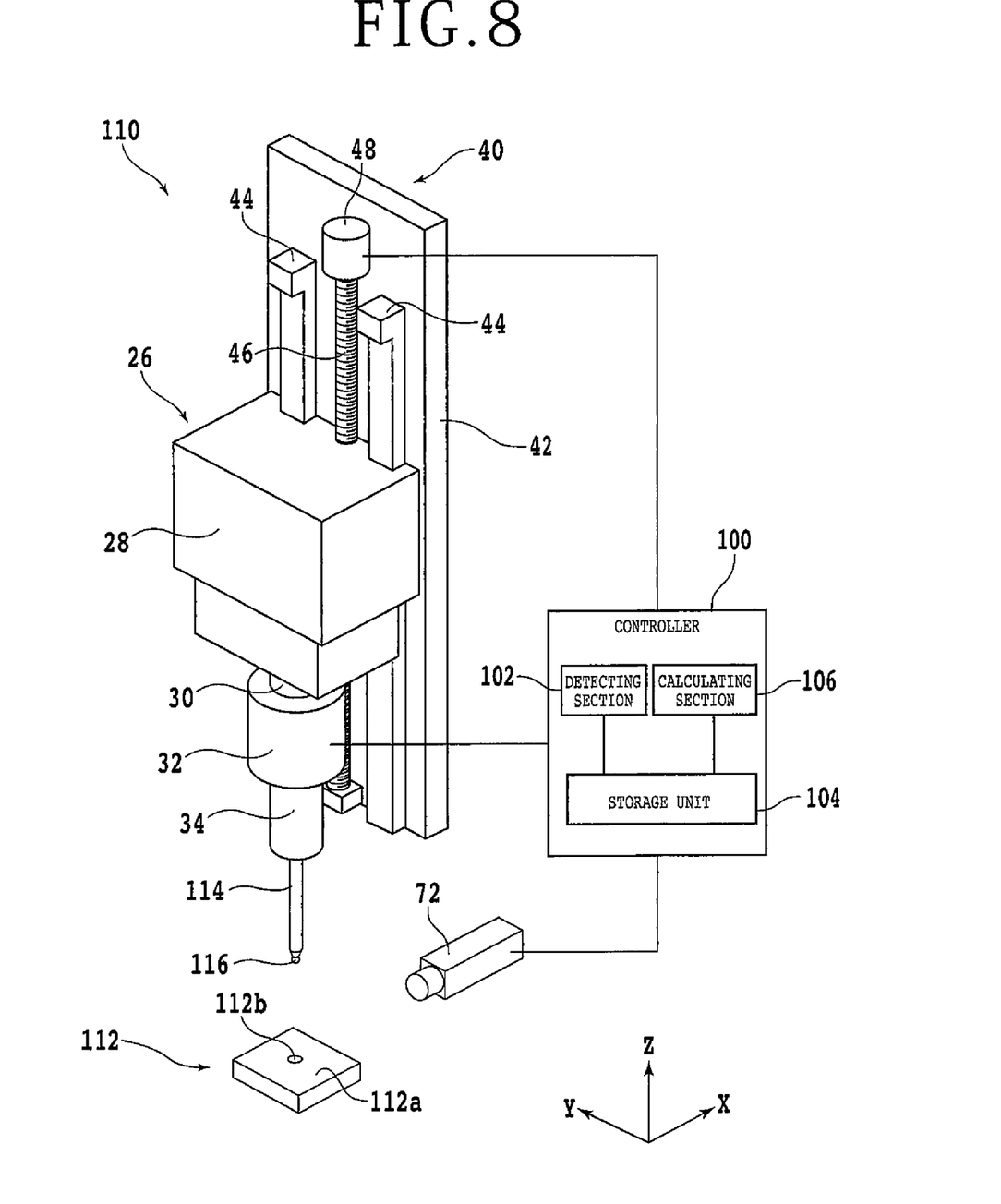
FIG. 8 is a perspective view of a measuring apparatus for measuring a flexural strength of a test piece according to a ball flexural strength test.

FIG. 8 illustrates in perspective a measuring apparatus 110 for measuring a flexural strength of a test piece 11 according to a ball flexural strength test. The measuring apparatus 110 illustrated in FIG. 8 is different from the measuring apparatus 2 in that it includes a support member or support unit 112 instead of the support unit 6 (see FIG. 1) and also includes a third support member 114 and a presser 116 instead of the gripper 36 and the presser 38 (see FIG. 1). The other components of the measuring apparatus 110 are identical to those of the measuring apparatus 2. In FIG. 8, however, those components other than the pressing unit 26, the moving mechanism 40, the image capturing unit 72, the controller 100, and the support member 112 are omitted from illustration.

The support member 112 is a plate-like member or support member that supports the test piece 11 (see FIG. 5, etc.), and is disposed below the pressing unit 26. For example, the support member 112 is made of metal such as stainless steel, and is of a rectangular shape as viewed in plan. The support member 112 has an upper surface acting as a support surface 112a for supporting the lower surface of the test piece 11 thereon. The support member 112 has a cylindrical opening 112b defined therein that has an upper end exposed on the support surface 112a. The opening 112b is defined so as to extend vertically through the support member 112, for example. Insofar as the support surface 112a is able to support the test piece 11 thereon, the support member 112 is not limited to any particular shape.

The third support member 114 that is of a columnar shape is fixed to the lower end of the second support member 34 of the pressing unit 26. The presser 116 is shaped as a ball and fixed to the lower end of the third support member 114. The measuring apparatus 110 measures the mechanical strength of the test piece 11 by pressing the test piece 11 supported by the support member 112 with the presser 116. The opening 112b is defined in the support member 112 such that it is larger in diameter than the presser 116. Thus, the presser 116 can be inserted into the opening 112b. The presser 116 is disposed in a position above the support member 112 in alignment with the opening 112b in the support member 112.

For measuring the flexural strength of the test piece 11 on the measuring apparatus 110, the test piece 11 is placed on the support surface 112a of the support member 112. The test piece 11 is disposed to cover the upper end of the opening 112b in the support member 112.

Next, the moving mechanism 40 moves the pressing unit 26 downwardly to move the presser 116 toward the test piece 11. The presser 116 is then brought into contact with the test piece 11, causing the test piece 11 to bend (see FIG. 6). When the presser 116 is further moved toward the test piece 11, the test piece 11 is broken (see FIG. 7). The load applied to the presser 116 when the presser 116 presses the test piece 11 is measured by the load measuring unit 32.

The calculating section 106 of the controller 100 calculates the flexural strength of the test piece 11 on the basis of a size of the test piece 11, a size of the opening 112b in the support member 112, a size of the presser 116, and a load measured by the load measuring unit 32. The sizes of the test piece 11, the opening 112b, and the presser 116 are stored in the storage unit 104 in advance. In a case where the test piece 11 is of a disk shape, a thickness of the test piece 11 and a radius of the test piece 11 are stored as the size of the test piece 11 in the storage unit 104. In a case where the test piece 11 is of a square shape, the thickness of the test piece 11 and a length corresponding to one half of a width of the test piece 11 are stored as the size of the test piece 11 in the storage unit 104. A radius of the opening 112b and a radius of the presser 116 are stored respectively as the size of the opening 112b and the size of the presser 116 in the storage unit 104.

The acquisition of the sizes of the test piece 11, the opening 112b in the support member 112, and the presser 116 is not limited to any particular acquiring method. For example, the image capturing unit 72 may capture an image of the test piece 11 and the support member 112, and the detecting section 102 may detect the sizes of the test piece 11, the opening 112b, and the presser 116 on the basis of the captured image. Alternatively, the sizes of the test piece 11, the opening 112b in the support member 112, and the presser 116 may be measured in advance by another method and stored in the storage unit 104.

Figure 9:
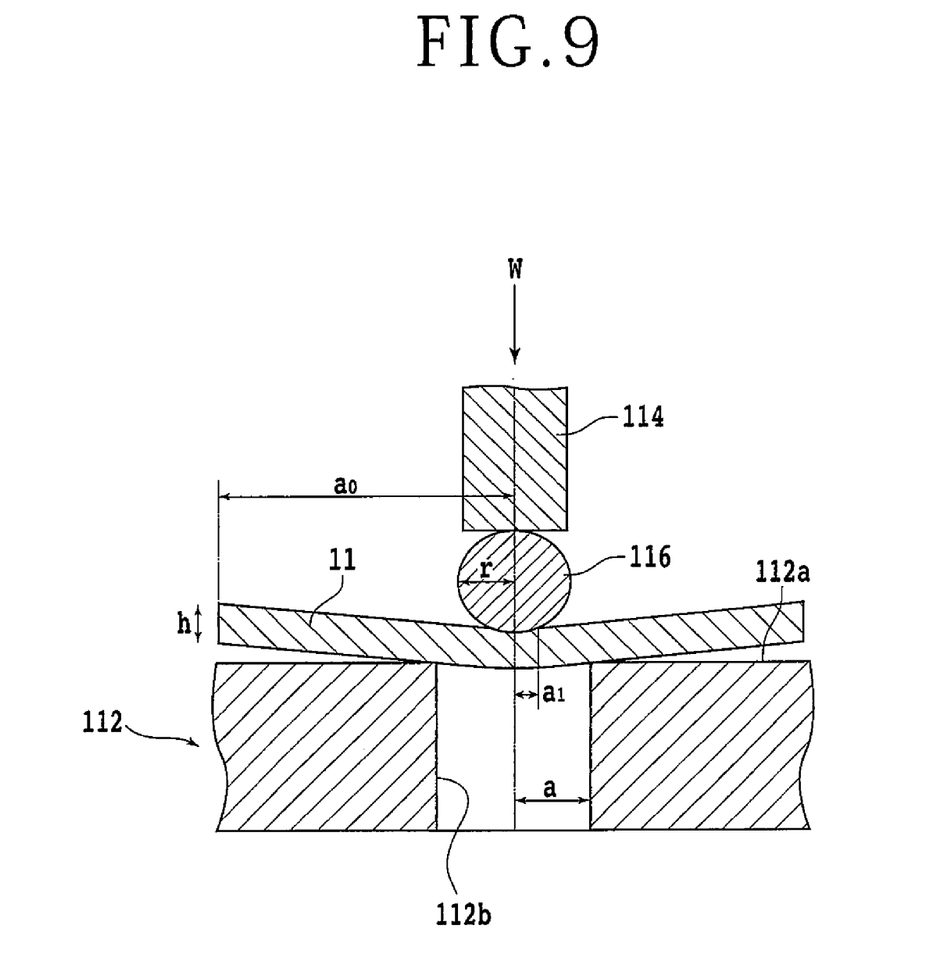
FIG. 9 is a fragmentary cross-sectional view schematically illustrating conditions for measuring the flexural strength of a test piece.

FIG. 9 schematically illustrates conditions for measuring the flexural strength of the test piece 11. In the ball flexural strength test, the flexural strength σ of the test piece 11 is expressed by the following equation (1):

$$\sigma = \frac{3W}{4\pi h^2}\left\{(1+v_1)\left(\frac{8}{3}+2\ln\frac{a}{a_1}-2\ln 2\right)+(1-v_1)\frac{a^2}{a_0^2}\left(1-\frac{2}{5}\frac{a_1^2}{a^2}\right)\right\} \quad (1)$$

In the equation (1), a, represents a contact radius of the presser 116 that contacts the test piece 11. The contact radius $a^1$ is expressed by the following equation (2):

$$a_1 = \left\{\frac{3}{4}r\left(\frac{1-v_1^2}{\epsilon_1}+\frac{1-v_2^2}{\epsilon_2}\right)W\right\}^{\frac{1}{3}} \quad (2)$$

In the equations (1) and (2), W represents the maximum value [N] of the load applied to the presser 116 that presses the test piece 11, r the radius [mm] of the presser 116, h the thickness [mm] of the test piece 11, a the radius [mm] of the opening 112b in the support member 112, $a_0$ the radius [mm] of the test piece 11, $v_1$ the Poisson's ratio of the test piece 11, $v_2$ the Poisson's ratio of the presser 116, $\epsilon_1$ the Young's modulus [MPa] of the test piece 11, and $\epsilon_2$ the Young's modulus [MPa] of the presser 116.

The thickness h and the radius $a_0$ of the test piece 11 and the radius r of the presser 116 are detected by the detecting section 102, for example, and stored in the storage unit 104. The maximum value W of the load corresponds to the load measured by the load measuring unit 32 at the time the test piece 11 is broken by being pressed by the presser 116, and is stored in the storage unit 104. The other parameters ($v_1$, $v_2$, $\epsilon_1$, $\epsilon_2$) used in the calculation of the flexural strength are stored in the storage unit 104 in advance. The calculating section 106 calculates the flexural strength σ of the test piece 11 according to the equations (1) and (2), using these values stored in the storage unit 104. Thus, the measuring apparatus 110 can automatically calculate the flexural strength of the test piece 11 on the basis of the results of the ball flexural strength test.

The structural details, methods, etc. according to the present embodiment may be changed or modified in appropriate manners without departing from the scope of the present invention.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A measuring apparatus for measuring a flexural strength of a test piece, comprising:
    a support unit having a first support member and a second support member that are spaced from each other, for supporting a lower surface of the test piece;
    a pressing unit including a presser for pressing the test piece, the presser being disposed in a position above the support unit in alignment with an area between the first support member and the second support member;

a moving mechanism attached to the pressing unit and configured for relatively moving the presser toward and away from the test piece supported by the support unit;

a load measuring unit on the pressing unit, and configured for measuring a load applied to the presser when the presser presses the test piece supported by the support unit; and a controller having a calculating section for calculating the flexural strength of the test piece on a basis of a thickness and a width of the test piece, a spacing between the first support member and the second support member, and a maximum value of the load measured by the load measuring unit.

2. The measuring apparatus according to claim 1, further comprising:

a support member moving mechanism for moving the first support member and the second support member toward and away from each other to adjust the spacing between the first support member and the second support member.

3. The measuring apparatus according to claim 1, further comprising:

an image capturing unit for capturing an image of the test piece, wherein the controller further includes a detecting section for detecting the thickness and the width of the test piece on a basis of the image of the test piece captured by the image capturing unit.

4. The measuring apparatus according to claim 1, wherein the support unit includes a first contact member on the first support member, and a second contact member on the second support member, wherein the first and second contact members are made of a deformable material.

5. The measuring apparatus according to claim 1, wherein the support unit includes a moving mechanism configured for moving the first and second support members toward and away from each other.

6. The measuring apparatus according to claim 1, further comprising an air supply unit that applies air to the presser.

7. The measuring apparatus according to claim 1, further comprising a lower container positioned below the presser, and fragment discharge port attached to the lower container, wherein fragments of test pieces are collected in the lower container and discharged through the fragment discharge port.

8. A measuring apparatus for measuring a flexural strength of a test piece, comprising:

a support member having a support surface for supporting a lower surface of the test piece and an opening defined therein that is exposed on the support surface;

a pressing unit including a ball presser disposed in a position above the support member in alignment with the opening in the support member, the ball presser being insertable into the opening;

a moving mechanism attached to the pressing unit and configured for relatively moving the ball presser toward and away from the test piece supported by the support member;

a load measuring unit on the pressing unit and configured for measuring a load applied to the ball presser when the ball presser presses the test piece supported by the support member; and a controller having a calculating section for calculating the flexural strength of the test piece on a basis of a size of the test piece, a size of the opening, a size of the ball presser, and a maximum value of the load measured by the load measuring unit.

9. The measuring apparatus according to claim 8, further comprising an air supply unit that applies air to the presser.

10. The measuring apparatus according to claim 8, further comprising a lower container positioned below the presser, and fragment discharge port attached to the lower container, wherein fragments of test pieces are collected in the lower container and discharged through the fragment discharge port.

11. A measuring apparatus for measuring a flexural strength of a test piece, comprising:

a support unit having a first support member and a second support member that are spaced from each other, for supporting a lower surface of the test piece;

a presser for pressing the test piece, the presser being disposed in a position above the support unit in alignment with an area between the first support member and the second support member;

a moving mechanism for relatively moving the presser toward and away from the test piece supported by the support unit;

a load measuring unit for measuring a load applied to the presser when the presser presses the test piece supported by the support unit; and an image capturing unit for capturing an image of the test piece, a controller having a detecting section for detecting a thickness and a width of the test piece on a basis of the image of the test piece captured by the image capturing unit, and a calculating section for calculating the flexural strength of the test piece on a basis of the thickness and the width of the test piece, a spacing between the first support member and the second support member, and a maximum value of the load measured by the load measuring unit.

12. The measuring apparatus according to claim 11, wherein the support unit includes a first contact member on the first support member, and a second contact member on the second support member, wherein the first and second contact members are made of a deformable material.

13. The measuring apparatus according to claim 11, wherein the support unit includes a moving mechanism configured for moving the first and second support members toward and away from each other.

14. The measuring apparatus according to claim 11, further comprising an air supply unit that applies air to the presser.

15. The measuring apparatus according to claim 11, further comprising a lower container positioned below the presser, and fragment discharge port attached to the lower container, wherein fragments of test pieces are collected in the lower container and discharged through the fragment discharge port.

* * * * *